United States Patent
Seko et al.

(10) Patent No.: US 6,843,287 B2
(45) Date of Patent: Jan. 18, 2005

(54) TIRE/WHEEL ASSEMBLY AND RUN-FLAT SUPPORT MEMBER

(75) Inventors: Akikazu Seko, Hiratsuka (JP); Takuzo Sano, Hiratsuka (JP); Noboru Takada, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 30 days.

(21) Appl. No.: 10/613,029

(22) Filed: Jul. 7, 2003

(65) Prior Publication Data

US 2004/0025994 A1 Feb. 12, 2004

(30) Foreign Application Priority Data

Jul. 22, 2002 (JP) ........................................ 2002-211974

(51) Int. Cl.[7] .............................................. B60C 17/06
(52) U.S. Cl. ...................... 152/156; 152/158; 152/520
(58) Field of Search ................................ 152/156, 158, 152/520, 248, 249

(56) References Cited

U.S. PATENT DOCUMENTS

| | | | |
|---|---|---|---|
| 6,463,974 B1 * | 10/2002 | Hellweg et al. ........ | 152/520 X |
| 6,463,976 B1 * | 10/2002 | Glinz et al. ................ | 152/520 |
| 6,672,349 B1 * | 1/2004 | Glinz et al. ................ | 152/156 |
| 2002/0195183 A1 * | 12/2002 | Glinz et al. ................ | 152/400 |
| 2004/0003880 A1 * | 1/2004 | Kuramori et al. ......... | 152/516 |
| 2004/0011448 A1 * | 1/2004 | Kuramori et al. ......... | 152/517 |

FOREIGN PATENT DOCUMENTS

| | | |
|---|---|---|
| DE | 101 33 534 C1 * | 10/2002 |
| DE | 101 49 086 C1 * | 2/2003 |
| DE | 101 61 365 A1 * | 6/2003 |
| DE | 102 08 613 C1 * | 6/2003 |
| JP | 10-297226 A1 | 11/1998 |
| JP | 2001-163020 A1 | 6/2001 |
| JP | 2001-519279 A1 | 10/2001 |

* cited by examiner

*Primary Examiner*—Adrienne C. Johnstone
(74) *Attorney, Agent, or Firm*—Rader, Fishman & Grauer PLLC

(57) ABSTRACT

A tire/wheel assembly in which a run-flat support member 3 is inserted into a cavity of a pneumatic tire 2, where the run-flat support member 3 includes a circular shell 4 in which the outer circumferential side thereof is used as a support surface and the inner circumferential side thereof is opened to have two leg portions, and elastic rings 5 supporting the ends of the two leg portions on a rim. An air path 7 is provided in the elastic ring 5 so as to interconnect the inside and outside of the run-flat support member 3.

14 Claims, 2 Drawing Sheets

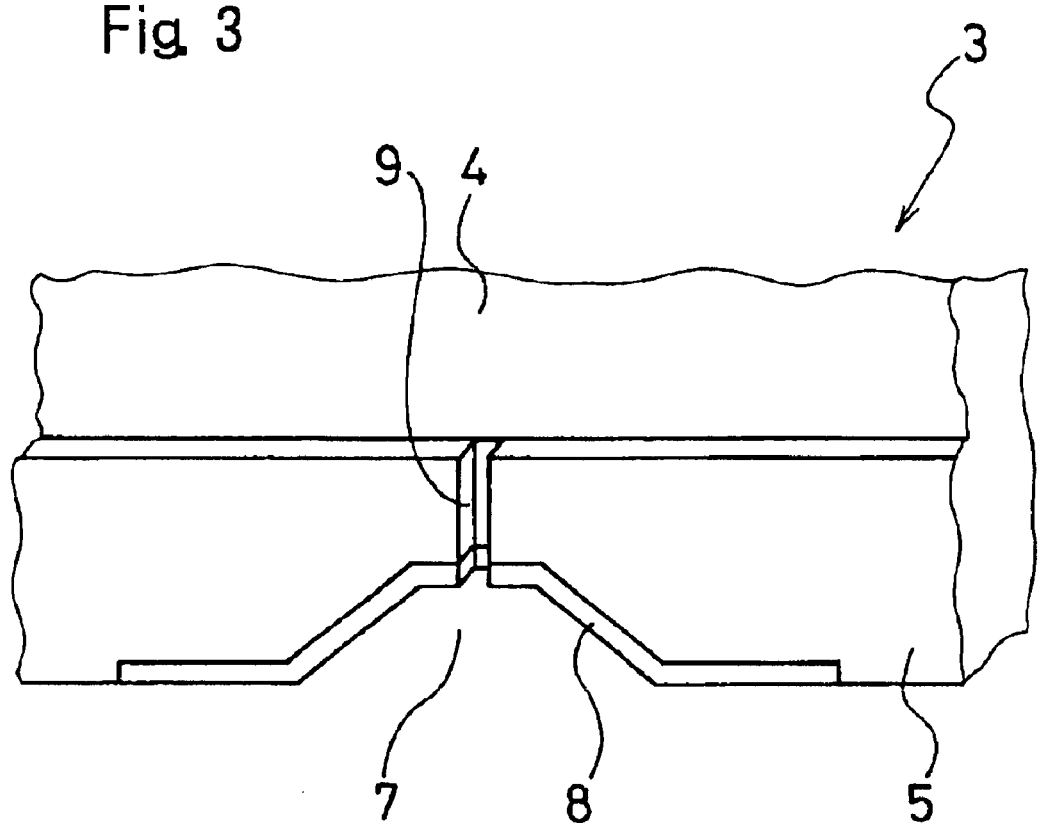

TIRE/WHEEL ASSEMBLY AND RUN-FLAT SUPPORT MEMBER

BACKGROUND OF THE INVENTION

The present invention relates to a tire/wheel assembly and a run-flat support member, and more specifically, to a tire/wheel assembly and a run-flat support member in which both workability of tire-to-rim fit and run-flat durability have been achieved.

In response to demands from the market, there have been many technologies proposed to allow a vehicle to run urgently for several hundreds of kilometers even when a pneumatic tire is punctured while the vehicle is running. Amongst these many proposals, technologies proposed in Japanese Patent Laid-Open Publication No. 10-297226 and Published Japanese Translation of a PCT Application No. 2001-519279 enable run-flat traveling by fitting a core onto a rim in the inner side of a cavity of a pneumatic tire that is assembled to the rim, and by supporting the punctured tire using the core.

The foregoing run-flat core includes a circular shell in which the outer circumferential side thereof serves as a support surface and the inner circumferential side thereof is opened so as to form two leg portions. Also, elastic rings are fitted to both leg portions of the circular shell, and thus the run-flat core is supported on the rim through the elastic rings. By using this run-flat core, a conventional wheel and rim can be used as they are without any particular modifications. Therefore, the run-flat core is advantageously adopted without causing confusion in the market.

Tire-to-rim fit operations of the above tire/wheel assembly (wheel) are as follows. A run-flat core is inserted into the inside of a pneumatic tire, and pressure is given to the inside of the tire having the core therein by air inflation. While the tire is inflated, beads of the pneumatic tire and inner edges of the run-flat core are slid on rim seats together until they are ultimately fixed to respective specified positions. However, since a cavity inside the run-flat core and a cavity between the pneumatic tire and the run-flat core are maintained as mutually independent spaces, it is difficult to balance inner pressure of both cavities during inflation. Therefore, there has been a problem that the workability of tire-to-rim fit is unstable.

If a through-hole is provided in the circular shell so as to allow both cavities to communicate with each other, both cavities can constantly maintain the same inner pressure during an inflating operation. Consequently, the workability of tire-to-rim fit is improved, thus facilitating the operation of the same. However, the fact that the through-hole is provided in the circular shell causes a problem that intensive stresses are applied on the through-hole during run-flat traveling, and thus the circular shell is easily damaged in early stages. Hence, the durability of the run-flat core is lowered.

Specifically, there has been a problem that it is hard to achieve both workability of tire-to-rim fit of a tire/wheel assembly (wheel) and durability of the same.

SUMMARY OF THE INVENTION

An object of the present invention is to provide a tire/wheel assembly in which both tire-to-rim fit workability and ran-flat durability can be achieved. Another object of the present invention is to provide a run-flat support member in which both tire-to-rim fit workability and ran-flat durability can be achieved.

In the tire/wheel assembly of the present invention for achieving the foregoing object, a run-flat support member is inserted in a cavity of a pneumatic tire, where the run-flat support member includes a circular shell in which the outer circumferential side thereof is used as a support surface and the inner circumferential side thereof is opened to have two leg portions, and elastic rings for supporting the ends of the two leg portions on the rim. This tire/wheel assembly is characterized in that the elastic ring has an air path for interconnecting the inside and outside of the run-flat support member.

Moreover, the run-flat support member of the present invention includes a circular shell in which the outer circumferential side thereof is used as a support surface and the inner circumferential side thereof is opened to have two leg portions, and elastic rings for supporting the ends of the two leg portions on the rim. The run-flat support member is characterized in that the elastic ring has an air path for interconnecting the inside and outside of the run-flat support member.

Since the air path is provided on the elastic ring to interconnect the inside and outside of the run-flat support member as described above, the same inner pressure can be constantly maintained in both cavities of the inside and outside of the run-flat support member during an inflating operation while the tire is fitted to the rim. Therefore, tire-to-rim fit operations can be facilitated. Moreover, because the air path is provided in the elastic ring but not in the circular shell, the circular shell will not be damaged in early stages, thus enhancing the run-flat durability of the run-flat support member. Therefore, according to the present invention, both tire-to-rim fit workability and run-flat durability can be supported.

BRIEF DESCRIPTION OF THE DRAWINGS

FIG. 3 is a cross-sectional side view showing a main part of a run-flat support member according to another embodiment of the present invention.

DESCRIPTION OF THE PREFERRED EMBODIMENTS

Figure 1:
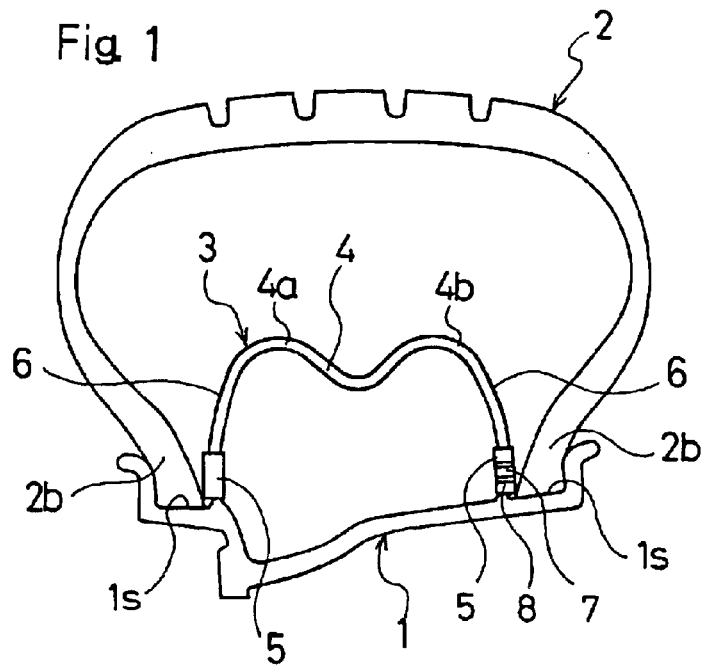
FIG. 1 is a cross-sectional view along a meridian line showing a main part of a tire/wheel assembly according to an embodiment of the present invention.

In the present invention, a run-flat support member is formed as a circular member which is inserted into a cavity of a pneumatic tire. This run-flat support member is formed to have its outer diameter smaller than the inner diameter of the cavity of the pneumatic tire in order to maintain a certain distance from the inner surface of the cavity. The inner diameter of the run-flat support member is formed to be approximately the same as the inner diameter of beads of the pneumatic tire. Then, the run-flat support member is inserted into the inside of the pneumatic tire and assembled to a wheel together with the pneumatic tire through a rim, thus configuring the tire/wheel assembly. When the pneumatic tire is punctured while driving the vehicle with the tire/wheel assembly fitted thereto, the tire flattened out due to the puncture is supported on the outer circumferential surface of the run-flat support member, thus making run-flat traveling possible.

The above-described run-flat support member is constituted of the circular shell and elastic rings as main members thereof.

In the circular shell, a continuous support surface for supporting a punctured tire is formed in the outer circumferential side (outer diameter side), and the inner circumferential side (inner diameter side) is in an open shape having two leg portions serving as respective sidewalls on the right and left sides. The support surface on the outer circumferential side is formed to have a curved surface that is convex toward the outer diameter side, when viewed in the cross section profile that is orthogonal to a circumferential direction of the tire. The number of convex portions aligned in a width direction of the tire (tire axis direction) is plural, i.e., two or more.

The number of convex portions on the outer circumferential side of the circular shell may be either one or plural, i.e., two or more. However, with the plural number of convex portions, a load supported during run-flat traveling can be distributed to the plurality of convex portions, enabling the circular shell durability to be improved as a whole.

The elastic rings are fitted to each end of the two leg portions provided on the inner diameter side of the circular shell, and are abutted on rim seats on the right and left sides respectively, so as to support the circular shell. Since the elastic rings are made of rubber or elastic resin, the elastic rings do not only mitigate vibration of and impact upon the circular shell, but also are slip resistant with respect to the rim seats so that the circular shell is stably supported.

In the present invention, an air path is provided in the elastic ring so as to interconnect the outside and inside of the run-flat support member. The air path may be either a through-hole that penetrates the elastic ring, or a through-channel provided across the inner circumferential surface of the elastic ring. In addition, the cross-sectional shape of the air path may be any of circle, oval, or polygon such as triangle or quadrilateral.

By providing the air path for interconnecting the inside and outside of the run-flat support member in the above manner, the same inner pressure can be maintained in both cavities of the inside and outside of the run-flat support member during an inflating operation while the tire is fitted to the rim. Therefore, tire-to-rim fit operation if facilitated. Accordingly, the workability of tire-to-rim fit is facilitated. Further, the air path is provided in the elastic ring, but not in the circular shell, which is a main part for supporting a load during run-flat traveling. Hence, the circular shell will not be damaged in early stages, which helps to improve run-flat durability of the run-flat support member.

Preferably, the air path is reinforced in a radial direction by disposing a reinforcing material on the periphery of the air path, in which the reinforcing material having an elasticity modulus (compressive elasticity modulus, in particular) that is higher than that of the constituent material of the elastic ring. The reinforcing material, which is not particularly limited as long as it has a higher elasticity modulus than that of the elastic ring, may be metal or resin, etc. Moreover, a method of disposing the reinforcing material is not particularly limited, as long as it provides reinforcing effect in a radial direction. However, it is preferable that the air path is edged with the reinforcing material along the inner circumferential surface thereof.

The elastic ring, in the region where the air path is provided as above, preferably has compressive rigidity (compressive elasticity modulus) in a radial direction that is within a range from 90 to 110% of that of the elastic ring in the region where no air path is provided. If the compression elasticity modulus of the region with the air path is lower than 90% or higher than 110% of that of the region without the air path, the two regions become largely different in rigidity, causing vibration to be easily generated during run-flat traveling.

The level of compressive rigidity of the region where the air path is provided can be set not only by selecting a material for the reinforcing material, but also by selecting thickness of the reinforcing material, a cross-sectional area for each air path or the number of the air path to be arranged.

For example, thickness of the reinforcing material is preferably within a range from 0.5 to 3.0 mm. The cross-sectional area in one air path is preferably within a range from 75 to 200 mm$^2$. Specifically, the air path preferably has its size with a length of 3 to 10 mm in a circumferential direction of the elastic ring, and a width in a diameter direction of 3 to 10 mm, which is the half or shorter than the height of elastic ring in a diameter direction.

Additionally, it is preferable that two to ten air paths are provided in one run-flat support member. The above number of air paths are arranged in a circumferential direction of the elastic ring at equal intervals, and the air paths in the right elastic ring and those in the left elastic ring are arranged so as to be topologically staggered with each other. This arrangement at equal intervals as well as the staggering arrangement of the air paths as mentioned above equalize compressive rigidity of the elastic rings in the circumferential direction, whereby generation of vibration is reduced during run-flat traveling.

Incidentally, when the run-flat support member is fitted to the rim together with the pneumatic tire, the elastic ring comes to contact with or to the extreme vicinity of the inner wall of the bead of the pneumatic tire. Accordingly, the inner wall of the bead occasionally blocks the air path provided in the elastic ring. If the air path is blocked in this way, workability of tire-to-rim fit is reduced. In order to prevent the reduction of workability, an interconnecting channel for interconnecting the air path and the tire cavity may be provided in the outside wall of the elastic ring.

Due to the fact that the run-flat support member has to support a vehicle weight through a punctured tire, the circular shell is made of a hard material. For the constituent material of the circular shell, metal or resin, etc. is used. As for metal, for example, steel or aluminum, etc. is listed. The resin can be any of thermoplastic resin and thermosetting resin. Examples of the thermoplastic resin are nylon, polyester, polyethylene, polypropylene, polystyrene, polyphenylene sulfide and ABS. Examples of the thermosetting resin are epoxy resin and unsaturated polyester resin. The single resin can be used, or the resin can contain reinforcing fibers compounded therein to be used as fiber-reinforced resin.

Hereinafter, amore specific description of the present invention will be provided based on embodiments illustrated in the drawings.

Figure 2:
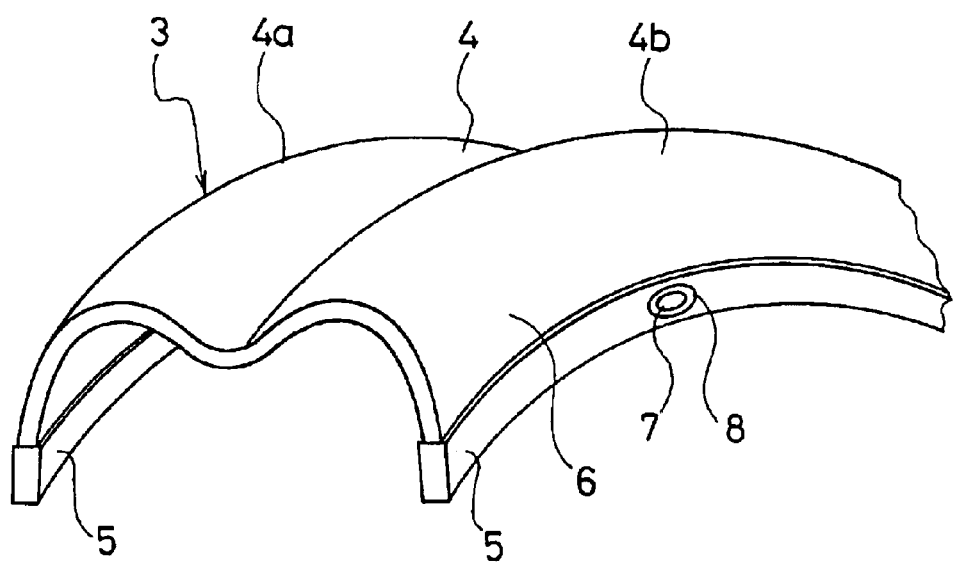
FIG. 2 is a fragmentary perspective view showing the run-flat support member used in the tire/wheel assembly of FIG. 1.

FIG. 1 is a cross-sectional view along a tire width direction (a cross-sectional view along a meridian line) showing a main part of the tire/wheel assembly (wheel) according to an embodiment of the present invention. FIG. 2 is a fragmentary perspective view showing the run-flat support member used in this tire/wheel assembly.

In FIGS. 1 and 2, the reference number 1 denotes a rim on the circumference of a wheel, the reference number 2 denotes a pneumatic tire, and the reference number 3 denotes a run-flat support member. The rim 1, pneumonic tire 2, and run-flat support member 3 are formed in a circular shape coaxially around the rotation axis of the wheel (not shown).

The run-flat support member 3 includes a circular shell 4 made of a hard material such as metal or resin, and elastic rings 5 made of an elastic material such as high hardness rubber or elastic resin. The circular shell 4 is formed to have two convexly curved surfaces forming convex portions 4a, 4b that are aligned in a tire width direction on the circumferential side of the circular shell 4.

The inner circumferential side of the circular shell 4 is opened to have sidewalls on both sides thereof, respectively serving as leg portions 6, 6, and elastic rings 5, 5 are fitted to the ends of the leg portions. The elastic ring 5 has an air path 7 that interconnects the inside and outside of the run-flat support member 3. In addition, the air path 7 is edged with a reinforcing material 8 made of metal or resin. The reinforcing material 8 has an elasticity modulus higher than that of high hardness rubber or elastic resin used for the elastic ring 5, thereby reinforcing the air path 7.

The number of air paths 7 provided is plural, that is, two to ten in total. These air paths 7 are arranged at equal intervals in a circumferential direction of the elastic ring 5. At the same time, the air paths in the right elastic ring 5 and those in the left elastic ring 5 are arranged to be topologically staggered with each other.

The run-flat support member 3 configured in the foregoing manner is inserted into the pneumatic tire 2, and then the elastic rings 5, 5 are fitted to rim seats 1s, 1s of the rim 1 simultaneously with beads 2b, 2b.

Since the run-flat support member 3 has the air path 7 for interconnecting the inside and outside of the elastic ring 5, the same inner pressure is constantly maintained in both cavities of the inside and outside of the run-flat support member 3 during an inflating operation while the tire is fitted to the rim, thereby facilitating tire-to-rim fit operations. Moreover, because the air path 7 is provided in the elastic ring 5, but not in the circular shell 4, the circular shell 4 will not be damaged in early stages. In particular, reinforcement of the air path 7 by the use of the reinforcing material 8 can further enhance the durability of the circular shell 4. Consequently, the run-flat durability of the run-flat support member can be improved.

FIG. 3 shows a main part of a run-flat support member according to another embodiment of the present invention.

In this embodiment, the air path 7 is not provided as a through-hole, but as a through-channel in the inner circumferential surface of the elastic ring 5. The air path 7 (through-channel) is edged by the reinforcing material 8 so that the air path 7 is reinforced, and the reinforcing material 8 extends to the inner circumferential edge of the elastic ring 5 where the air path 7 is not provided.

Additionally, an interconnecting channel 9 is provided on the upper part (outer circumferential side) of the air path 7. The interconnecting channel 9 penetrates the reinforcing material 8 as well as elastic ring 5 along the outer wall of the elastic ring 5, communicating with the cavity of the pneumatic tire 2. Therefore, even when the air path 7 is blocked by the tire bead during tire-to-rim fit operations, the interconnecting channel 9 can communicate with the cavity of the pneumatic tire 2. Consequently, the same inner pressure in the inside and outside of the run-flat support member is maintained, and thus good workability of tire-to-rim fit can be maintained.

As hitherto described, according to the present invention, the air path is provided in the elastic ring so as to interconnect the inside and outside of the run-flat support member. Thus, the same inner pressure can be constantly maintained in the inside and outside of the run-flat support member during an inflating operation while the tire is fitted to the rim. Therefore, tire-to-rim fit operation is facilitated. Moreover, since the air path is provided in the elastic ring, but not in the circular shell, the circular shell will not be damaged in early stages. Thus, the run-flat durability of the run-flat support member is enhanced.

What is claimed is:

1. A tire/wheel assembly in which a run-flat support member is inserted in a cavity of a pneumatic tire, the run-flat support member including a circular shell in which an outer circumferential side thereof is used as a support surface and an inner circumferential side thereof is opened to have two leg portions, and elastic rings supporting ends of the two leg portions on a rim, wherein an air path is provided in the elastic ring so as to interconnect an inside and outside of the run-flat support member.

2. The tire/wheel assembly according to claim 1, wherein a reinforcing material is arranged in a periphery of the air path, the reinforcing material having an elasticity modulus higher than that of the elastic ring.

3. The tire/wheel assembly according to claim 2, wherein a region where the air path is provided has compressive rigidity in a radial direction in a level of 90 to 110% of compressive rigidity of a region where no air path is provided.

4. The tire/wheel assembly according to any one of claims 2 and 3, wherein the reinforcing material has a thickness of 0.5 to 3.0 mm.

5. The tire/wheel assembly according to any one of claims 1 to 3, wherein a total number of the air paths is two to ten, the air paths are arranged at equal intervals in a circumferential direction of the elastic ring, and the air paths in the right elastic ring and the air paths in the left elastic ring are arranged to be topologically staggered with each other.

6. The tire/wheel assembly according to any one of claims 1 to 3, wherein a cross-sectional area of one air path is 75 to 200 $mm^2$.

7. The tire/wheel assembly according to any one of claims 1 to 3, wherein an interconnecting channel is provided in an outer surface of the elastic ring so as to interconnect the air path and the tire cavity.

8. A run-flat support member, comprising:

a circular shell in which an outer circumferential side thereof is used as a support surface and an inner circumferential side thereof is opened to have two leg portions; and elastic rings which support ends of the two leg portions on a rim, wherein an air path is provided in the elastic ring so as to interconnect an inside and outside of the run-flat support member.

9. The run-flat support member according to claim 8, wherein a reinforcing material is arranged in a periphery of the air path, the reinforcing material having an elasticity modulus higher than that of the elastic ring.

10. The run-flat support member according to claim 9, wherein a region where the air path is provided has compressive rigidity in a radial direction in a level of 90 to 110% of compressive rigidity of a region where no air path is provided.

11. The run-flat support member according to any one of claims 9 and 10, wherein the reinforcing material has a thickness of 0.5 to 3.0 mm.

12. The run-flat support member according to any one of claims 9 and 10, wherein a total number of the air paths is two to ten, the air paths are arranged at equal intervals in a circumferential direction of the elastic ring, and the air paths in the right elastic ring and the air paths in the left elastic ring are arranged to be topologically staggered with each other.

13. The run-flat support member according to any one of claims 9 and 10, wherein a cross-sectional area of one air path is 75 to 200 mm$^2$.

14. The run-flat support member according to any one of claims 9 and 10, wherein an interconnecting channel is provided in an outer surface of the elastic ring so as to interconnect the air path and a tire cavity.

* * * * *